US012645394B2

(12) United States Patent
Hsu et al.

(10) Patent No.: US 12,645,394 B2
(45) Date of Patent: Jun. 2, 2026

(54) MEMORY SYSTEMS, METHODS OF OPERATING THE SAME, AND STORAGE MEDIUMS

(71) Applicant: Yangtze Memory Technologies Co., Ltd., Wuhan (CN)

(72) Inventors: Haochiang Hsu, Wuhan (CN); Hua Tan, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/782,932

(22) Filed: Jul. 24, 2024

(65) Prior Publication Data

US 2025/0335121 A1      Oct. 30, 2025

(30) Foreign Application Priority Data

Apr. 26, 2024     (CN) .......................... 202410517325.0

(51) Int. Cl.
*G06F 3/00* (2006.01)
*G06F 3/06* (2006.01)
(52) U.S. Cl.
CPC .......... *G06F 3/0656* (2013.01); *G06F 3/0604* (2013.01); *G06F 3/0652* (2013.01); *G06F 3/0658* (2013.01); *G06F 3/0659* (2013.01); *G06F 3/0679* (2013.01)

(58) Field of Classification Search
CPC .... G06F 3/0652; G06F 3/0656; G06F 3/0658; G06F 3/0659; G06F 3/0604
See application file for complete search history.

(56) References Cited

U.S. PATENT DOCUMENTS

| | | | | |
|---|---|---|---|---|
| 2017/0351428 A1* | 12/2017 | Liu | ..................... | G06F 16/1847 |
| 2021/0004173 A1* | 1/2021 | Yeh | ..................... | G06F 12/0246 |
| 2021/0064274 A1* | 3/2021 | Lee | ..................... | G06F 3/0656 |

* cited by examiner

*Primary Examiner* — Reginald G Bragdon
*Assistant Examiner* — Michael L Westbrook
(74) *Attorney, Agent, or Firm* — Hanley, Flight & Zimmerman, LLC

(57) ABSTRACT

Examples of the present application provide memory systems, methods of operating thereof, and storage mediums. An example memory system includes at least one memory device and a memory controller; the memory controller is coupled with both a host and the memory device and includes a write buffer and a control section coupled with the write buffer; the control section is configured to: in response to upcoming execution of an erase event of a block in the memory device, configure a portion of an idle storage space of the memory controller as a newly-added storage space of the write buffer; write data received from the host to the newly-added storage space of the write buffer in response to execution of the erase event; and release the newly-added storage space of the write buffer in response to completion of the erase event.

20 Claims, 5 Drawing Sheets

MEMORY SYSTEMS, METHODS OF OPERATING THE SAME, AND STORAGE MEDIUMS

CROSS-REFERENCE TO RELATED APPLICATION

The present disclosure claims the benefit of priority to China Application No. 202410517325.0, filed on Apr. 26, 2024, the content of which is incorporated herein by reference in its entirety.

TECHNICAL FIELD

Examples of the present application relate to the technical field of semiconductors, and in examples to memory systems, methods of operating the same, and storage mediums.

BACKGROUND

With the advancement of technologies and the high-speed development of the Internet, people have increasingly high requirements on storage and retention of information data.

DETAILED DESCRIPTION

Figure 1:
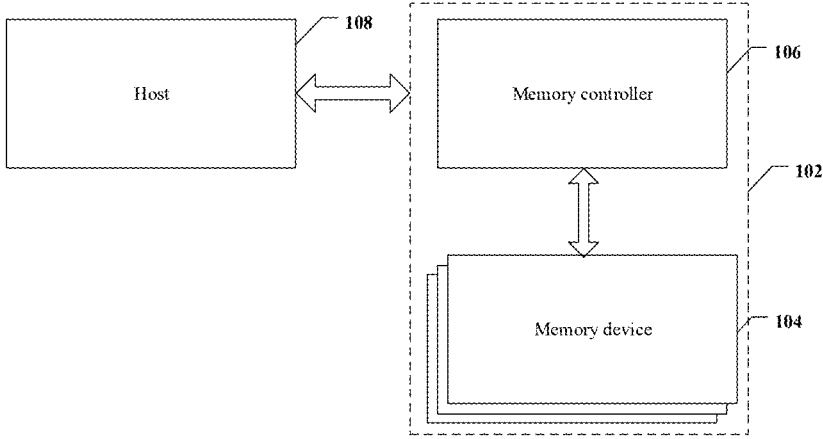
FIG. 1 is a schematic diagram of an example system having a memory system according to an example of the present application.

The technical solutions in implementations of the present application will be described below clearly and completely in conjunction with the implementations and the drawings of the present application. Apparently, the described implementations are merely part, but not all, of the implementations of the present application. All other implementations obtained by those of ordinary skills in the art based on the implementations in the present application without creative work shall fall within the protection scope of the present application.

In the description below, many details are presented to provide a more thorough understanding of the present application. However, it is apparent to those skilled in the art that the present application may be carried out without one or more of these details. In other examples, in order to avoid confusion with the present application, some technical features well-known in the art are not described. That is, all the features of the actual examples are not described herein, and well-known functions and structures are not described in detail.

In the drawings, the sizes of a layer, a region, and an element and their relative sizes may be exaggerated for clarity. Like reference numerals denote like elements throughout.

It is to be understood that when an element or a layer is referred to as being "on", "adjacent to", "connected to", or "coupled to" other elements or layers, it may be directly on, adjacent to, connected to, or coupled to the other elements or layers, or one or more intervening elements or layers may be present. In contrast, when an element is referred to as being "directly on", "immediately adjacent to", "directly connected to", or "directly coupled to" other elements or layers, no intervening elements or layers are present. It is to be understood that, although the terms first, second, and third, etc., may be used to describe various elements, components, areas, layers and/or portions, these elements, components, areas, layers and/or portions should not be limited by these terms. These terms are only used to distinguish one element, component, area, layer or portion from another element, component, area, layer or portion. Therefore, without departing from the teaching of the present application, a first element, component, area, layer, or portion discussed below may be represented as a second element, component, area, layer, or portion. While the second element, component, area, layer, or portion is discussed, it does not mean that the first element, component, area, layer, or portion is necessarily present in the present application.

The spatially relative terms, such as "beneath", "below", "lower", "under", "above", and "upper", may be used herein for ease of description to describe a relationship of one element or feature with respect to other elements or features as illustrated in the figures. It is to be understood that in addition to orientations shown in the drawings, the spatial relationship terms are intended to further comprise different orientations of a device in use and operation. For example, if the device in the drawings is turned over, then an element or a feature described as being "below other elements", or "under other elements", or "beneath other elements" will be orientated as being "above" the other elements or features. Thus, the example terms "below" and "beneath" may comprise both upper and lower orientations. The device may be orientated otherwise (rotated by 90 degrees or in other orientations), and the spatial descriptive terms used herein are interpreted accordingly.

A purpose of the terms used here is only to describe the examples and not as a limitation to the present application. As used herein, unless otherwise indicated expressly in the context, "a", "an" and "the" in a singular form are also intended to comprise a plural form. It is also to be understood that terms "comprised of" and/or "comprise", when used in this specification, determine the presence of described features, integers, steps, operations, elements and/or components, but do not preclude the presence or addition of one or more of other features, integers, steps, operations, elements, components, and/or groups. As used herein, the term "and/or" comprises any and all combinations of related items listed.

In order to understand the present application thoroughly, detailed operations and detailed structures will be proposed in the following description to set forth the technical solution of the present application. The detailed descriptions of the preferable examples of the present application are as follows. However, the present application may also have other implementations in addition to these detailed descriptions.

The memory device in the examples of the present application include, but is not limited to, a three-dimensional NAND memory. In order to facilitate the understanding, the illustration is made by taking the three-dimensional NAND memory as an example. Further, it is crucial to improve the performance of memory systems as people have increasingly high requirements on storage and retention of information data.

FIG. 1 illustrates a block diagram of an example system 100 having a memory device according to some aspects of the present application. The system 100 may be a mobile phone, a desktop computer, a laptop computer, a tablet computer, a vehicle computer, a gaming console, a printer, a positioning apparatus, a wearable electronic apparatus, a smart sensor, a Virtual Reality (VR) apparatus, an Augmented Reality (AR) apparatus, or any other suitable electronic apparatuses having memories therein. As shown in FIG. 1, the system 100 may comprise a host 108 and a memory system 102, and the memory system 102 has one or more memory devices 104 and a memory controller 106. The host 108 may be a processor of an electronic apparatus (e.g., a Central Processing Unit (CPU)) or a System on Chip (SoC) (e.g., an Application Processor (AP)). The host 108 may be configured to send or receive data to or from the memory device 104.

According to some implementations, the memory controller 106 is coupled to the memory device 104 and the host 108, and configured to control the memory device 104. The memory controller 106 can manage data stored in the memory device 104 and communicate with the host 108. In some implementations, the memory controller 106 is designed for operating in a low duty-cycle environment, such as a Secure Digital (SD) card, a Compact Flash (CF) card, a Universal Serial Bus (USB) flash drive, or other media for use in electronic apparatuses, such as a personal computer, a digital camera, and a mobile phone.

In some implementations, the memory controller 106 is designed for operating in a high duty-cycle environment Solid State Disk (SSD) or embedded Multi Media Card (eMMC) which is used as a data memory for a mobile apparatus, such as a smartphone, a tablet computer, a laptop computer, etc., and an enterprise memory array.

The memory controller 106 may be configured to control operations of the memory device 104, such as read, erase, and program operations. The memory controller 106 may be further configured to manage various functions with respect to data stored or to be stored in the memory device 104, including, but not limited to, bad-block management, garbage collection, logical-to-physical address translation, and wear leveling, etc. In some implementations, the memory controller 106 is further configured to process an error correction code with respect to the data read from or written to the memory device 104.

The memory controller 106 may further perform any other suitable functions as well, for example, formatting the memory device 104. The memory controller 106 may communicate with an external apparatus (e.g., the host 108) according to a communication protocol. For example, the memory controller 106 may communicate with the external apparatus through at least one of various interface protocols, such as a USB protocol, an MMC protocol, a Peripheral Component Interconnection (PCI) protocol, a PCI Express (PCI-E) protocol, an Advanced Technology Attachment (ATA) protocol, a Serial ATA protocol, a Parallel ATA protocol, a Small Computer Small Interface (SCSI) protocol, an Enhanced Small Disk Interface (ESDI) protocol, an Integrated Drive Electronics (IDE) protocol, and a Firewire protocol, etc.

The memory controller 106 and the one or more memory devices 104 may be integrated into various types of storage apparatuses, e.g., be included in the same package (such as a Universal Flash Storage (UFS) package or an eMMC package). That is, the memory system 102 may be implemented and packaged into different types of end electronic products.

Figure 2A:
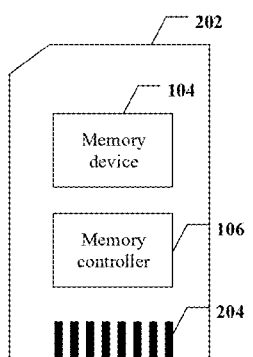
FIG. 2A is a schematic diagram of an example memory card having a memory system according to an example of the present application.

In an example shown in FIG. 2A, the memory controller 106 and a single memory device 104 may be integrated into a memory card 202. The memory card 202 may include a PC card (Personal Computer Memory Card International Association (PCMCIA)), a CF card, a Smart Media (SM) card, a memory stick, a multimedia card (MMC, RS-MMC, MMC-micro), an SD card (SD, miniSD, microSD, SDHC), and a UFS, etc. The memory card 202 may further comprise a memory card connector 204 coupling the memory card 202 with a host (e.g., the host 108 in FIG. 1).

Figure 2B:
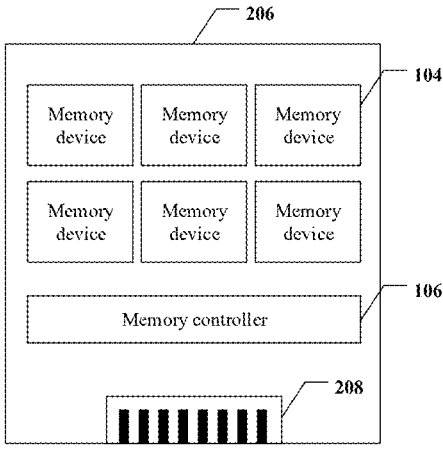
FIG. 2B is a schematic diagram of an example solid state drive having a memory system according to an example of the present application.

In another example as shown in FIG. 2B, the memory controller 106 and a plurality of memory devices 104 may be integrated into an SSD 206. The SSD 206 may further comprise an SSD connector 208 coupling the SSD 206 with a host (e.g., the host 108 in FIG. 1). In some implementations, at least one of a storage capacity or an operation speed of the SSD 206 is greater than that of the memory card 202.

Figure 3:
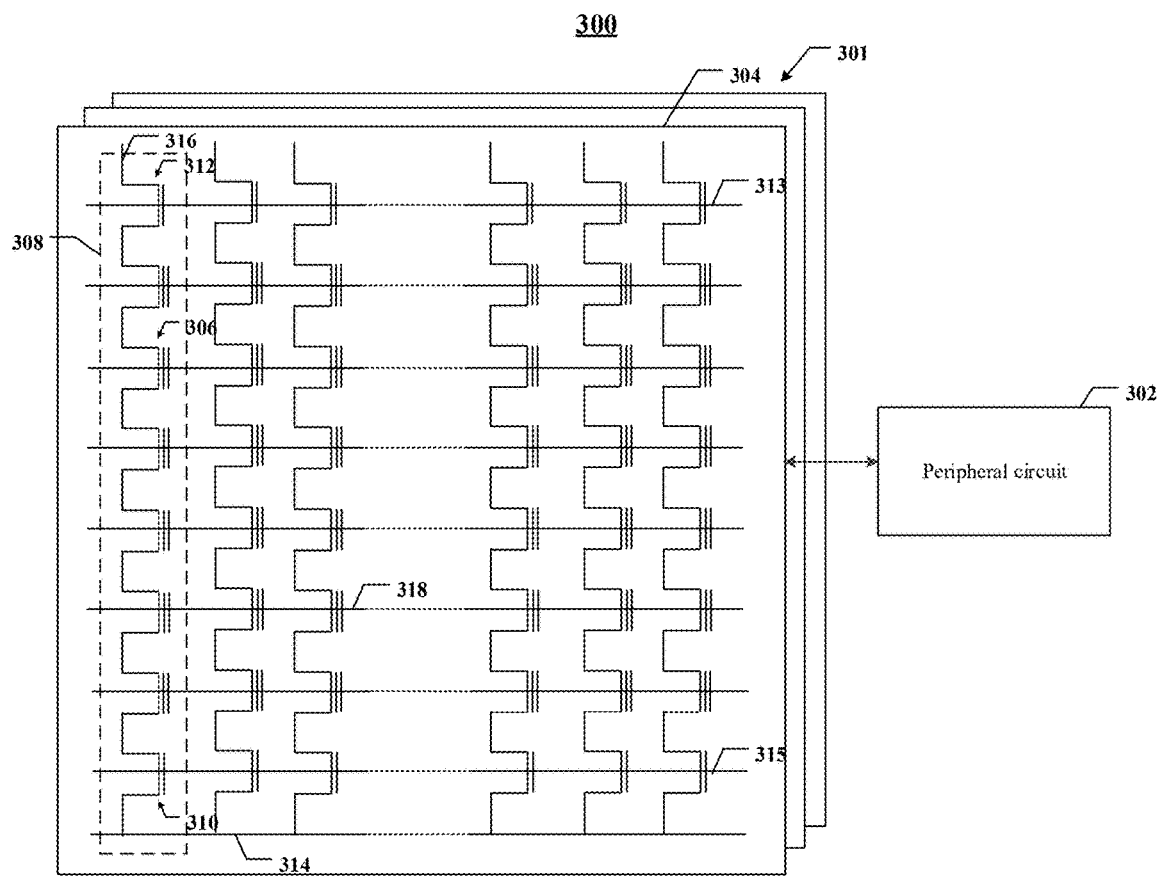
FIG. 3 is a schematic diagram of an example memory comprising a peripheral circuit according to an example of the present application.

FIG. 3 illustrates a schematic circuit diagram of an example memory device 300 comprising a peripheral circuit according to some aspects of the present application. The memory device 300 may be an example of the memory device 104 in FIG. 1. The memory device 300 may comprise a memory cell array 301 and a peripheral circuit 302 coupled to the memory cell array 301. For example, the memory cell array 301 is a three-dimensional NAND memory array, wherein a memory cell 306 is a NAND memory cell, memory cells 306 are provided in the form of an array of memory strings 308, and each memory string 308 extends above a substrate (not shown) vertically. In some implementations, each memory string 308 comprises a plurality of memory cells 306 coupled in series and stacked vertically. Each memory cell 306 may maintain a continuous analog value, such as a voltage or charge, which depends on the number of electrons trapped within a region of the memory cell 306. Each memory cell 306 may be a floating gate memory cell that comprises a floating gate transistor, or a charge trap memory cell that comprises a charge trap transistor.

In some implementations, each memory cell 306 is a single-level cell (SLC) that has two possible memory states and thus may store one bit of data. For example, a first memory state "0" may correspond to a first voltage range, and a second memory state "1" may correspond to a second voltage range. In some implementations, each memory cell 306 is a Multi-Level Cell (MLC) that can store more than one bit of data in more than four memory states. For example, the MLC may store two bits per cell (which may also be referred to as a Double-Level Cell), three bits per cell (also referred to as a Trinary-Level Cell (TLC)), four bits per cell (also referred to as a Quad-Level Cell (QLC)), five bits per cell (also referred to as a Penta-Level Cell (PLC)), or more than five bits per cell. Each MLC can be programmed to assume a range of possible nominal memory values. In one example, if each MLC stores two bits of data, the MLC can be programmed to employ one of three possible programmed levels from an erased state by writing one of three possible nominal storage values to the cell, and a fourth nominal storage value may be used for the erased state.

It is to be noted that the memory state described here is the memory state of the memory cell described in the present application. Different memory cells have different numbers of memory states, for example, a SLC-type memory cell has 2 memory states (i.e., two states of memory), wherein the 2 memory states comprise one programmed state and one erased state. For another example, an MLC-type memory cell has 4 memory states, wherein the 4 memory states comprise: one erased state and three programmed states. For still another example, a TLC-type memory cell has 8 memory states, wherein the 8 memory states comprise: one erased state and seven programmed states. In some implementations, a QLC-type memory cell has 16 memory states, wherein the 16 memory states comprise: one erased state and fifteen programmed states.

As shown in FIG. 3, each memory string 308 may comprise a bottom select gate (BSG) (also referred to as a source side select transistor) 310 at a source terminal thereof and a top select gate (TSG) (also referred to as a drain side select transistor) 312 at a drain terminal thereof. The BSG 310 and the TSG 312 may be configured to activate a selected memory string 308 during a read operation and a program operation. In some implementations, sources of memory strings 308 in the same block 304 are coupled through the same source line (SL) 314 (e.g., a common SL). In other words, according to some implementations, all the memory strings 308 in the same block 304 have an array common source (ACS). According to some implementations, the TSG 312 of each memory string 308 is coupled to a respective Bit Line (BL) 316, and data may be read from or written to the bit line 316 via an output bus (not shown). In some implementations, each memory string 308 is configured to be selected or unselected by applying a select voltage (e.g., above a threshold voltage of a transistor having the TSG 312) or an unselect voltage (e.g., 0 V) to the respective TSG 312 via one or more TSG lines 313 and/or by applying a select voltage (e.g., above a threshold voltage of a transistor having the BSG 310) or an unselect voltage (e.g., 0 V) to the respective BSG 310 via one or more BSG lines 315.

As shown in FIG. 3, memory strings 308 may be organized into a plurality of blocks 304, and each of the plurality of blocks 304 may have a common source line 314 (e.g., coupled to the ground). In some implementations, each block 304 is a basic data unit for an erase operation, i.e., all of the memory cells 306 on the same block 304 are erased at the same time. In order to erase the memory cells 306 in a selected block 304, the source line 314 coupled to the selected block 304 as well as unselected blocks 304 that are in the same plane as the selected block 304 may be biased with an erase voltage (Vers) (e.g., a high positive voltage (such as 20 V or higher)). It is to be understood that in some examples, an erase operation may be performed at a half block level, a quarter block level, or a level having any suitable number of blocks or any suitable fraction of a block. The memory cells 306 of adjacent ones of the memory strings 308 may be coupled through the word line 318, wherein the word line 318 selects which row of memory cells 306 to be affected by the read and program operations.

With reference to FIG. 3, each of the plurality of memory cells 306 is coupled to the respective word line 318, and each memory string 308 is coupled to the respective bit line 316 through a respective select transistor (such as the top select gate (TSG) 312).

Figure 4:
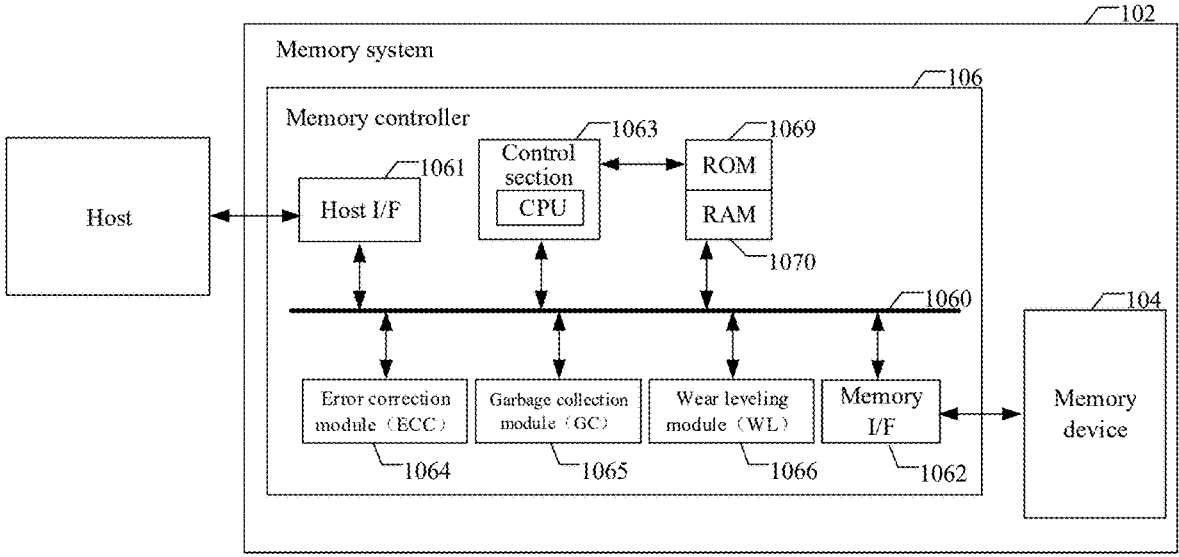
FIG. 4 is a schematic diagram of an example constituent structure having a memory system provided by an example of the present application.

With reference to FIG. 4, in some examples, the memory system 102 is coupled with a host, and performs various types of feedback in response to instructions of the host. The memory system 102 may comprise the memory controller 106 and the memory device 104. The memory controller 106 is configured to control the memory device 104 to perform operations such as read, write, erase, etc. The memory controller 106 may also be coupled with the memory device 104 in any appropriate pattern.

The memory controller 106 may comprise a host interface (I/F) 1061, a memory interface (I/F) 1062, a control section 1063, a Read-Only Memory (ROM) 1069, a Random Access Memory (RAM) 1070, an error correction module 1064, a garbage collection module 1065, a wear leveling module 1066, and a bus 1060. The host interface 1061 is a connection interface that connects the host 108 and the memory controller 106. The host interface 1061 allows the host and the memory controller to communicate according to a protocol, send read and write requests, and perform other operations. The memory interface 1062 is a connection interface between the memory controller 106 and the memory device 104, and the memory interface 1062 is configured to achieve data transmission between the memory controller 106 and the memory device 104. The control section 1063 is configured to control the memory system 102 integrally. The above operations performed by the memory controller are mainly performed and completed by the control section 1063 here. In some examples, the control section 1063 is, for example, a central processing unit (CPU), a microcontroller unit (MCU), etc. The ROM 1069 typically comprises firmware or firmware program codes of the memory controller 106. These codes are used to initialize and operate various components of the memory controller, and the RAM 1070 is typically configured to buffer data. The error correction module 1064 may further comprise an encoding section and a decoding section. The encoding section is configured to encode data to be stored, so as to obtain check data, and the decoding section is configured to decode the check data to detect and correct possible error data in a process of data transmission.

The garbage collection module 1065 is configured to: after a storage space of the memory device reaches a certain threshold, read out valid data in some blocks, perform rewrite, and then label these blocks, so as to obtain new spare blocks. A general implementation of garbage collection may comprise three operations: selecting a source block with a small amount of valid data; finding the valid data from the source block; and writing the valid data to a target block. In this case, all the data in the source block becomes invalid data, and the source block is labeled and may be used as a new spare block. The wear leveling module 1066 is configured to keep wear (erase counts) of all the blocks in the memory system leveled through data statistics and algorithms. A general implementation of wear leveling may comprise two operations: selecting a source block in which cold data is located; and reading valid data on the source block and writing same to a block with a relatively large erase count. In this case, the valid data in the source block becomes invalid data, and the source block is labeled. The RAM 1070 may be configured to buffer data.

In the field of memory systems, for example, the field of Solid State Drive (SSD) storage, a consumer SSD stores personal data of a user, and an enterprise SSD (eSSD) stores private information of a user, with these data being extremely important for individuals and enterprises. A write delay is a crucial evaluation index for the memory system (such as the eSSD). The write delay refers to a duration from sending a command by the host to returning a command by the memory system, wherein when the length of time for returning the command is shorter, the performance of the memory system is better.

Figure 5:
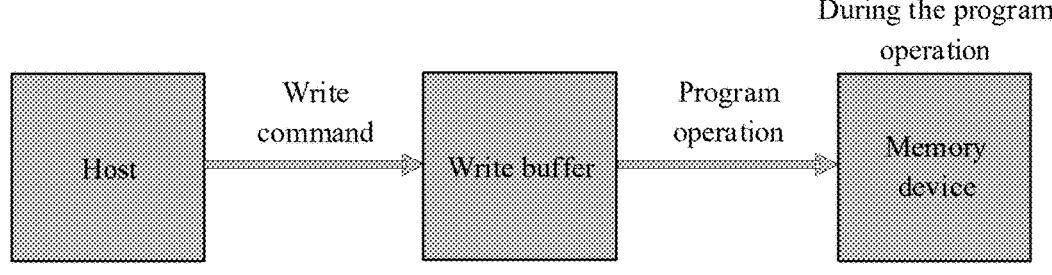
FIG. 5 is a schematic diagram of example execution of a program operation having a memory system according to an example of the present application.

With reference to FIG. 5, since a duration of the host transmitting data is shorter than a duration of writing data to the memory device (e.g., NAND), in order to reduce impacts caused by writing data to the memory device, a write buffer is introduced into the memory system, wherein in response to a write command sent by the host, the data transmitted by the host is first accumulated into the write buffer, i.e., writing the write data of the host to the write buffer. After accumulated to a certain amount in the write buffer, the data in the write buffer is written/programmed to the memory device integrally, which may reduce the write delay of the memory system. However, in some scenarios, such as a scenario in which an erase event is triggered upon use of a new block, data cannot be written to the memory device during an erase operation, resulting in blocking and increasing the write delay. Therefore, optimization of the write delay in this scenario is required.

Figure 6:
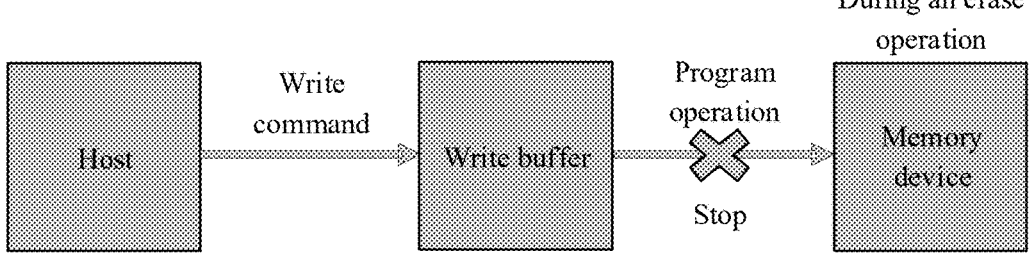
FIG. 6 is a schematic diagram of example execution of an erase operation having a memory system according to an example of the present application.

With reference to FIG. 6, during use of the memory device, the erase event is triggered before each time of programming a new block. When the erase event cannot be interrupted, data cannot be written to the memory device during the erase operation, so that a delay caused by the erase operation is required to be added to the write delay, and when the duration of the erase operation is prolonged, the addition of the delay caused by the erase operation has a more severe impact on the performance of the memory system.

Although the write buffer may well reduce the impacts of the program duration, data cannot be written to the memory device during the erase operation when the erase event occurs, resulting in an increase in the write delay.

In view of this, examples of the present application provide a memory system, a method of operating the same, and a storage medium.

Figure 7:
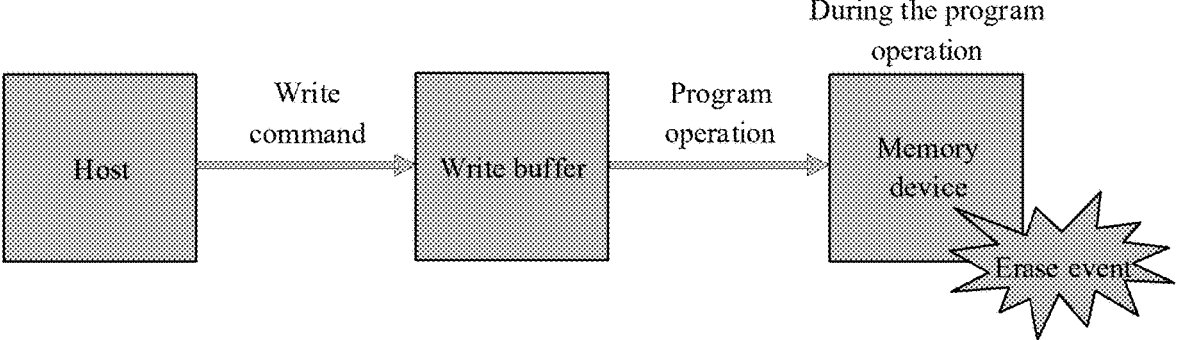
FIG. 7 is another schematic diagram of example execution of a program operation having a memory system according to an example of the present application.
Figure 8:
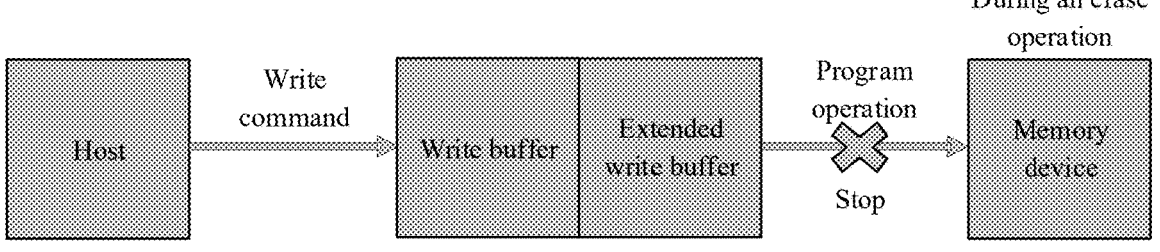
FIG. 8 is another schematic diagram of example execution of an erase operation having a memory system according to another example of the present application.
Figures 9, 10:
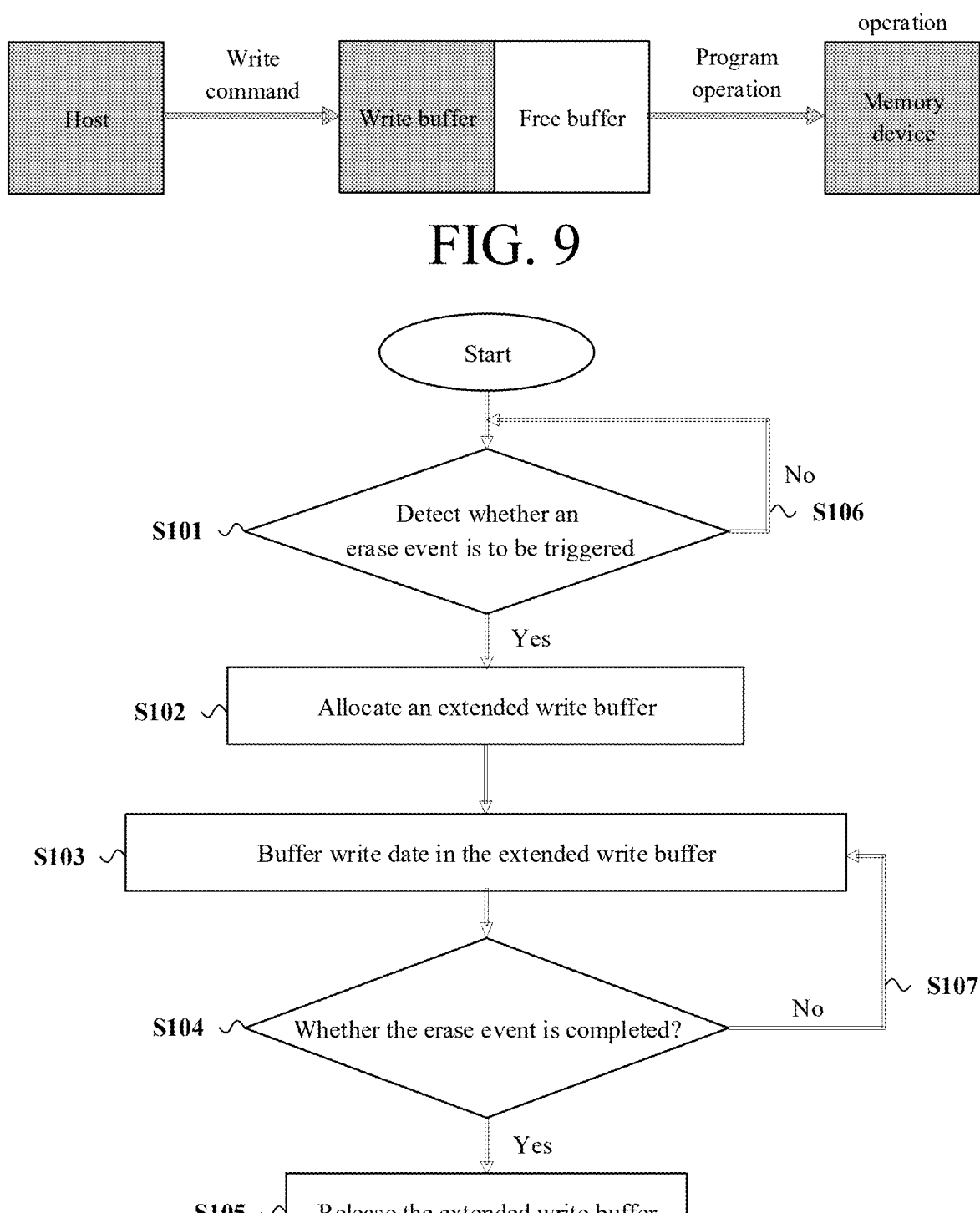
FIG. 9 is another schematic diagram after example completion of execution of another erase operation having a memory system according to another example of the present application.
FIG. 10 is a flow block diagram of an method of operating a memory system provided by an example of the present application.

In a first aspect, examples of the present application provide a memory system. With reference to FIG. 7, FIG. 8, and FIG. 9, the memory system comprises at least one memory device and a memory controller, wherein the memory controller is coupled with both a host and the memory device and comprises a write buffer and a control section coupled with the write buffer; the control section is configured to: in response to upcoming execution of an erase event of a block in the memory device, configure a portion of an idle storage space of the memory controller as a newly-added storage space of the write buffer; write data received from the host to the newly-added storage space of the write buffer in response to execution of the erase event; and release the newly-added storage space of the write buffer in response to completion of the erase event.

Here, the structure of the memory system may be understood with reference to relevant descriptions of FIG. 1, FIG. 2A, FIG. 2B, FIG. 3, and FIG. 4, and is no longer repeated here.

Here, the control section of the memory controller may be understood with reference to the control section 1063 of the memory controller 106 in FIG. 4. The control section 1063 is configured to overall controls the memory system 102. The control section 1063 may be coupled with the RAM 1070 via the bus 1060.

Here, the write buffer of the memory controller may be understood with reference to the RAM 1070 of the memory controller 106 in FIG. 4, and is configured to buffer data transmitted by the host. In some examples, the write buffer may be a portion of the RAM 1070, and the RAM 1070 may also store other intermediate data of the memory controller in a firmware running process. The write buffer may not be a fixed hardware storage structure, the write buffer may be subjected to a periodic refresh operation, and the write buffer may represent a storage space of the memory system to be allocated to the write data.

Here, the storage space of the memory controller may include the RAM 1070 of the memory controller 106 in FIG. 4, which is configured to buffer processing data of the memory controller. The idle storage space of the memory controller may comprise a space, that can be utilized, of the RAM 1070 in FIG. 4. For example, a portion of the storage space of the RAM 1070 may be allocated as an extended write buffer, wherein the extended write buffer may be configured to buffer data transmitted by the host (e.g., the write data of the host), and a storage space of the extended write buffer serves as the newly-added storage space of the write buffer. The extended write buffer is released to become a free buffer, and the storage space of the free buffer continues to serve as a storage space of the memory controller for buffering the processing data of the memory controller. The storage space of the write buffer serves as the original storage space of the write buffer and is still used to buffer the data transmitted by the host.

In the examples of the present application, the newly-added storage space of the write buffer may be understood as the storage space of the extended write buffer, and the original storage space of the write buffer may be understood as the storage space of the write buffer.

As described above, when a block is full and the opening of a new block is required to continue writing of data to be written, an erase operation is required to be performed on the new block first. In some examples, the entire erase process experienced by each new block may be referred to as an erase event. It may be understood that the erase event is an event executed by the memory device under control of the memory controller, and the memory controller may decide whether the opening of a new block is required according to a use situation of a current block and a situation of the data to be written, thereby making a decision as to whether the execution of the erase event is upcoming. In some examples, that the memory controller sends an erase command to the memory device or prepares to send an erase command to the memory device (e.g., the memory controller has made a decision of the erase event but has not yet sent the erase command) may be regarded as a point of judgment for the upcoming execution of the erase event.

With reference to FIG. 7, in response to the write command sent by the host, the data transmitted by the host is buffered to the write buffer, and a program operation is performed on the memory device when the data in the write buffer is accumulated to a certain amount, so as to write/ program the data accumulated to a certain amount in the write buffer to the memory device in one time. The erase event may be triggered during the program operation, for example, the erase event is triggered every time a new block is used.

In some examples, the execution of the erase event may be understood as an entire execution process of performing an erase operation on the block under control of the peripheral circuit of the memory device. During the erase operation, the memory device can no longer perform the respective write operation in response to the write command of the memory controller, as the peripheral circuit is occupied by the erase process. At this time, since an original write buffer is also in a relatively full state of preparing to write data to the memory device, on such basis, the original write buffer has an insufficient space and can no longer respond to the write command of the host, and since the duration of the erase operation is relatively long, a relatively long delay of the write data of the host may be caused.

In some examples, the completion of the erase event may be understood as an end of the entire execution process of performing an erase operation on the block under control of the peripheral circuit of the memory device.

With reference to FIG. 8, since data cannot be written to the memory device during the erase operation in the process of the erase operation after the erase event is triggered during the program operation, execution of the program operation stops. The timing that the erase event occurs may be detected. For example, the portion of the idle storage space of the memory controller is configured as the extended write buffer in response to the upcoming execution of the erase event of the block in the memory device; and the data received from the host is written to the storage space of the extended write buffer in response to the execution of the erase event. The storage space of the extended write buffer can be utilized during the erase operation, increasing data of the host buffered to the extended write buffer.

In some examples, Firmware (FW) can detect from input/output (IO) scheduling whether an erase event, a start of the erase event, and a completion of the erase event is about to be executed. In some examples, whether the erase event is about to be executed may be judged through whether the memory controller sends the erase command to the memory device; and whether the erase operation is started/completed may be judged through feedback information of a start of execution of erasure and a completion of the erasure sent by the memory device to the memory controller or by querying a busy signal within the memory device.

Before the execution of the erase event, the idle space of the memory controller (e.g., an idle space of SRAM or DRAM) is additionally requested as the extended write buffer, so as increase a buffer space (comprising the buffer space of the write buffer and the buffer space of the extended write buffer), and for a new write command of the host, the write data of the host is buffered to the space of the extended write buffer to mitigate the impact caused by the erase operation. In some examples, the FW may be a program that is stored in an electrically erasable programmable ROM (EEPROM) or a FLASH chip of the memory system and can be upgraded by the host through a refresh program. The firmware controls read/write and transmission algorithms of the memory system and allocates data storage reasonably. With reference to FIG. 9, the storage space of the extended write buffer is released in response to the completion of the erase event, and the extended write buffer is a free buffer, which can be used as a data buffer other than a write data buffer. After the erase operation is completed, the extended write buffer is released to become a free buffer, so as to avoid occupying the storage space of the memory controller for long time.

In an example, a size of the write buffer is M (MB), and a duration in which data cannot be programmed into the memory device during the erase operation is t_ERS, which may be understood as the duration of the erase operation. M (MB)=M*256 IOs (a size of each IO is 4 KB), read write performance per 4 KB is (M*256)/t_ERS, an average duration spent per IO is t_ERS/(M*256), queue data QD=256, and the write delay during the erase operation is t_ERS/(M*256)*QD=t_ERS/M.

For example, if the size of the write buffer is 4 MB and t_ERS=10 ms, the write delay for QD=256 is 10 ms/4=2.5 ms. Under the same condition, using the extended write buffer based on the 4 MB write buffer, with the size of the extended write buffer being 1 MB, the write delay for QD=256 is 10 ms/(4+1)=2 ms, wherein the write delay is reduced by 20%.

In some examples, the control section is configured to: cause all newly-added storage spaces allocated to the write buffer in response to erase events of different blocks to have the same size.

Here, considering that the differences between average durations of erase events of different blocks in the same memory device are not very large, the size of the newly-added storage space allocated to the write buffer is fixed.

In some examples, the size of the newly-added storage space allocated to the write buffer may be an empirical value, or may be a default value in a factory configuration of the memory device, which is obtained via extensive simulation experiments before the memory device leaves the factory. For example, the size of the newly-added storage space allocated to the write buffer is determined according to an average of durations of the erase events of different blocks obtained from the simulation experiments.

In the examples of the present application, the size of the newly-added storage space allocated to the write buffer is fixed, so that the stability of the memory system may be improved.

In some other examples, the control section is configured to: cause all the newly-added storage spaces allocated to the write buffer in response to the erase events of different blocks to have different sizes.

Here, for different blocks of different memory devices, there is a difference in storage capacities thereof, and there is a difference in average durations of erase events thereof; alternatively, for different blocks of the same memory device, there is also a difference in the average durations of the erase events thereof due to a difference in a manufacturing process, etc. At this time, finer control may be considered as well, i.e., the size of the newly-added storage space allocated to the write buffer may be determined based on the durations of the erase events of different blocks.

In some examples, the size of the newly-added storage space allocated to the write buffer is positively correlated with the average duration of the erase event of the block.

As described above, there may be a situation in which the durations of the erase events of different blocks in the same memory device are different due to the difference in the manufacturing process, etc. Here, the average of the different erase event durations corresponding to different blocks in the same memory device may be used as the average duration of the erase event of each block in the memory device.

In some examples, the average duration of the erase event of a block may be a default value in a factory configuration of the memory device, which is obtained via extensive simulation experiments before the memory device leaves the factory. For example, when the type of memory device is determined, the average duration of the erase event of a block is determined substantially.

In some examples, the average duration of the erase event of a block may be obtained during use of the memory device. For example, a process of acquiring the average duration of the erase event may comprise judging whether the erase event is started/completed by detecting the busy signal within the memory device during execution of an erase operation on a first block, so as acquire the duration of the erase event, and using the acquired duration of the erase event of the first block as an average duration of the erase events of all the other blocks of the memory device.

In the examples of the present application, the size of the newly-added storage space allocated to the write buffer varies according to the different average durations of the erase events of the blocks, so as to increase the flexibility of the memory system for reducing the write delay.

In some examples, the control section is configured to: write data stored in the write buffer to the memory device in response to an amount of data stored in an original storage space of the write buffer being greater than or equal to a preset threshold.

Here, in order to improve the utilization of the write buffer, the preset threshold may be set to be close to the amount of the data in the original storage space of the write buffer or equal to the amount of the data in the original storage space of the write buffer. The program operation of the memory device is triggered when the amount of the data stored in the original storage space of the write buffer is greater than or equal to the preset threshold. Here, the preset threshold may be an amount of data stored in at least a portion of the original storage space of the write buffer. The preset threshold may be an amount of data stored when the original storage space is full/nearly full. In an example, the preset threshold may be an amount of data stored in 100% of the original storage space (i.e., when the original storage space is full), or the preset threshold may be an amount of data stored in 80% of the original storage space (i.e., when the original storage space is nearly full), or the preset threshold may be any value between 80%-100% of the original storage space (i.e., when the original storage space is nearly full).

In some examples, the control section is configured to: in response to the memory device requiring opening of a new block for data writing, control the memory device to perform an erase operation on the new block before writing data to the new block, wherein a start of the erase operation is execution of the erase event, and an end of the erase operation is completion of the erase event.

In the examples of the present application, when one block is full of written data, it is required to open another block for data writing. The block to be opened may be referred to as a new block. An erase operation is required to be performed on the new block before writing data to the new block.

In some examples, the execution of the erase event may be understood as the entire execution process of performing a erase operation on the block under control of the peripheral circuit of the memory device. The completion of the erase event may be understood as a start of the entire execution process of performing an erase operation on the block under control of the peripheral circuit of the memory device, or the completion of the erase event may be understood as the end of the entire execution process of performing an erase operation on the block under control of the peripheral circuit of the memory device. As described above, whether the erase operation is started/completed may be judged through the feedback information of the start of execution of erasure and the completion of the erasure sent by the memory device to the memory controller or by querying the busy signal within the memory device.

In some examples, the control section is configured to: in response to the amount of the data stored in the original storage space of the write buffer being greater than or equal to the preset threshold and the memory device requiring the opening of the new block for data writing, determine the upcoming execution of the erase event of the memory device, generate an erase command, and send the erase command to the memory device.

When the amount of the data stored in the original storage space of the write buffer is greater than or equal to the preset threshold, it is required to write the data stored in the write buffer to the memory device, i.e., perform a program operation on the memory device. Meanwhile, during the program operation, upon detecting that the opening of a new block for data writing is required, the control section generates the erase command, and sends the erase command to the memory device, so as to trigger an erase event for the new block.

In some examples, the control section is configured to: in response to the completion of the erase event, write the data in the original storage space of the write buffer and the data in the newly-added storage space of the write buffer sequentially to the memory device in a chronological order of writing to the original storage space of the write buffer and to the newly-added storage space of the write buffer; and release the newly-added storage space of the write buffer in response to completion of writing the data in the newly-added storage space of the write buffer to the memory device.

In an example, the write buffer and the extended write buffer may be regarded as an integral buffer, and data written to the integral buffer is sequentially written to the memory device in the chronological order of writing the write data of the host to the integral buffer. For example, the write data of the host is written to the write buffer before the erase operation, and the write data of the host is written to the extended write buffer during the erase operation. The data written to the write buffer is written to the memory device prior to the data written to the extended write buffer.

The newly-added storage space of the write buffer is released, that is, the write buffer is released to become a free buffer. The write buffer is still configured to buffer the write data of the host, while the free buffer is not configured to buffer the write data of the host, but rather configured to buffer the processing data of the memory controller.

In some examples, the original storage space of the write buffer is smaller than a preset storage space.

Here, a large original storage space is allocated to the write buffer, and the preset threshold for dumping data from the write buffer to the memory device is still set to be the original storage space of the write buffer being full/nearly full. When a dump from the write buffer to the memory device is required, the amount of data stored in the write buffer is large, and at this time, a duration for writing the data stored in the write buffer to the memory device is long. During the dump of the data in the write buffer to the memory device, the write buffer is likewise unable to respond to the write operation of the host, and the dump of the data in the write buffer may lead to a severe host write delay per se. If the preset threshold for the dump from the write buffer to the memory device is set to be relatively small, the utilization of the original storage space of the write buffer may be caused to be not high.

Accordingly, the original storage space of the write buffer is generally set to be not very large, but rather be relatively small, and the preset threshold for the dump from the write buffer to the memory device is set to be that the original storage space of the write buffer is full/nearly full.

As the storage space allocated to the write buffer is not large sufficiently, a duration of writing from 0% to the entire space of the write buffer is still insufficient to cover the duration of the entire erase operation. In addition, the duration of writing to the memory device is shorter compared with the duration of the erase operation. For example, the storage space of the write buffer is 4 MB, the duration of the erase operation is 10 ms, and the duration of writing the 4 MB of data from the write buffer to the memory device is 1 ms. During the dump of the data in the write buffer to the memory device, the write buffer cannot respond to the write operation of the host. That is, a write delay of the memory system caused during the erase operation of the memory device (e.g., the duration of the erase operation is 10 ms) is significantly greater than a write delay of the memory system caused by the write operation (an operation of writing the data in the write buffer to the memory device) of the memory device (e.g., a duration of writing the data in the write buffer to the memory device is 1 ms). Accordingly, the handling of the write latency caused by the erase operations in the examples of the present application is highly effective.

In some examples, the memory controller further comprises a volatile memory device, and a portion of a storage space of the volatile memory device is used as the original storage space of the write buffer and the newly-added storage space of the write buffer.

Here, the volatile memory device may comprise the RAM 1070 of the memory controller 106 in FIG. 4. The RAM 1070 may be configured to buffer the data transmitted by the host or buffer the processing data of the memory controller. For example, at least a portion of the space of the RAM 1070 may be configured as the original storage space of the write buffer for buffering the data transmitted by the host (e.g., the write data of the host). During running of the firmware, at least a portion of the available space of the RAM 1070 may be allocated as the newly-added storage space of the write buffer (the storage space of the extended write buffer) for buffering the data transmitted by the host (e.g., the write data of the host).

In some examples, the volatile memory device may include a Dynamic Random-Access Memory (DRAM), a Synchronous Dynamic Random-Access Memory (SDRAM), or a Double-Data-Rate Fourth Generation Synchronous Dynamic Random Access Memory (DDR4 SDRAM). In some examples, the volatile memory device may also include a Static Random-Access Memory (SRAM).

In some examples, the memory device may be an apparatus comprising a FLASH chip (e.g., a three-dimensional NAND Flash memory). The FLASH chip may serve as a storage medium of the above memory system to store data.

In some examples, the memory device comprises a NAND, and the volatile memory device comprises an SRAM/DRAM.

In some examples, the memory system comprises an enterprise solid state drive (eSSD).

Since the eSSD have an advantage of a large DRAM space per se, the overall benefit of reducing the write delay is greater compared with increasing the buffer space of the write buffer by using a portion of the DRAM space, and a dynamic adjustment of the buffer in the examples of the present application is an increase occurring only during the erase operation, avoid occupying the DRAM space for long time.

In some examples, the control section is configured to: in response to the upcoming execution of the erase event of the block in the memory device and generation of the erase command, configure the portion of the idle storage space of the memory controller as the newly-added storage space of the write buffer.

In the examples of the present application, when the erase command is generated after the upcoming execution of the erase event of the block in the memory device, the storage space of the write buffer is dynamically increased.

In some examples, the control section is further configured to: during a period from the execution of the erase event to the completion of the erase event, configure another portion of the idle storage space of the memory controller as another newly-added storage space of the write buffer, and write data received from the host to the other newly-added storage space of the write buffer; and release the other newly-added storage space of the write buffer in response to the completion of the erase event.

In the examples of the present application, the storage space of the write buffer may be increased dynamically prior to the execution of the erase event; and the storage space of the write buffer may also be increased dynamically during the period from the execution of the erase event to the completion of the erase event.

In the examples of the present application, the control section of the memory system is configured to increase the storage space of the write buffer dynamically. In an implementation, a storage space is added temporarily to the write buffer when upcoming occurrence of the erase event of the block of the memory system is detected. The write buffer is increased for buffering write data sent by the host during the erase operation, and the write buffer is recovered to its original size after the erase operation is ended, wherein an available storage space of the write buffer during the erase operation comprises the original storage space of the write buffer and the added storage space, and the added storage space of the write buffer is released after the completion of the erase operation. As such, the extended storage space of the write buffer is used to buffer the write data sent by the host during the erase operation, so as to alleviate a latency caused by the write buffer without the extended storage space failing to respond to the write data of the host during the erase operation, reducing a write latency produced during the erase operation, and thereby improving the performance of the memory system.

In a second aspect, examples of the present application provide a method of operating a memory system, comprising: in response to upcoming execution of an erase event of a block in a memory device coupled with a memory controller of the memory system, configuring, by a control section of the memory controller, a portion of an idle storage space of the memory controller as a newly-added storage space of a write buffer of the memory controller coupled with the control section; writing data received from a host coupled with the memory controller to the newly-added storage space of the write buffer in response to execution of the erase event; and releasing the newly-added storage space of the write buffer in response to completion of the erase event.

With reference to FIG. 10 and FIG. 7, in response to the write command sent by the host, the data transmitted by the host is buffered to the write buffer, and a program operation is performed on the memory device when the data in the write buffer is accumulated to a certain amount, so as to write/program the data accumulated to a certain amount in the write buffer to the memory device in one time. The erase event may be triggered during the program operation, for example, the erase event is triggered every time a new block is employed.

With reference to FIG. 10 and FIG. 8, since data cannot be written to the memory device during the erase operation in the process of the erase operation after the erase event is triggered during the program operation, execution of the program operation stops. With reference to operation S101 in FIG. 10, a timing of the erase event may be detected. For example, with reference to operation S102 in FIG. 10, the portion of the idle storage space of the memory controller is configured as the extended write buffer in response to the upcoming execution of the erase event of the block in the memory device; and with reference to operation S103 in FIG. 10, the data received from the host is written to the storage space of the extended write buffer in response to the execution of the erase event. The storage space of the extended write buffer may be utilized during the erase operation, increasing data of the host buffered to the extended write buffer.

With reference to FIG. 10 and FIG. 9, the storage space of the extended write buffer is released in response to the completion of the erase event, and the extended write buffer is a free buffer. With reference to operation S104 in FIG. 10, whether the erase event is completed is judged; with reference to operation S105 in FIG. 10, after the erase operation is completed, the extended write buffer is released to become a free buffer. After the erase operation is completed, occupation of the storage space of the memory controller is avoided.

In some examples, with reference to operation S106 in FIG. 10, if the timing of the erase event is not detected, operation S101 may be continued to detect whether the erase event is to be triggered.

In some examples, with reference to operation S107 in FIG. 10, if the erase event is not completed, operation S103 may be continued to buffer the write data in the extended write buffer.

In the method of operating the memory system provided by the examples of the present application, the occurrence of the erase event is detected by the FW, an extention of the write buffer is requested on the basis of the write buffer, the data of the host is written to the extended write buffer until the completion of an action of the erase operation of the memory device, and finally the extended write buffer is released to become a free buffer. In the method of operating the memory system, the size of the extended write buffer size may be regulated by the FW, so as to reduce the impact of the erase operation on the write delay.

The method of operating the memory system provided by the examples of the present application can be detected in a continuous/random write scenario. In a sequential write scenario, the method of operating the memory system may allocate the size of the additional extended write buffer based on a short time duration (during an erase operation), so as to reduce the high delay that occurs during the erase operation, e.g., reduce the write delay of each input or output.

In some examples, the portion of the idle storage space of the memory controller is allocated to the write buffer, and the method comprises: causing all newly-added storage spaces allocated to the write buffer in response to erase events of different blocks to have the same size.

In some examples, the method comprises: writing data stored in the write buffer to the memory device in response to an amount of data stored in an original storage space of the write buffer being greater than or equal to a preset threshold.

In some examples, the method comprises: in response to the memory device requiring opening of a new block for data writing, controlling the memory device to perform an erase operation on the new block before writing data to the new block, wherein a start of the erase operation is execution of the erase event, and an end of the erase operation is completion of the erase event.

In some examples, the method comprises: in response to the amount of the data stored in the original storage space of the write buffer being greater than or equal to the preset threshold and the memory device requiring the opening of the new block for data writing, determining the upcoming execution of the erase event of the memory device, generating an erase command, and sending the erase command to the memory device.

In some examples, to release the newly-added storage space of the write buffer, the method comprises: in response to the completion of the erase event, writing the data in the original storage space of the write buffer and the data in the newly-added storage space of the write buffer sequentially to the memory device in an order of writing; and releasing the newly-added storage space of the write buffer in response to completion of writing the data in the newly-added storage space of the write buffer to the memory device.

In the examples of the present application, a method for dynamically increasing the storage space of the write buffer is provided. In an implementation, a storage space is added temporarily to the write buffer when upcoming occurrence of the erase event of the block of the memory system is detected. The write buffer is increased for buffering write data sent by the host during the erase operation, and the write buffer is recovered to its original size after the erase operation is ended, wherein an available storage space of the write buffer during the erase operation comprises the original storage space of the write buffer and the added storage space, and the added storage space of the write buffer is released after the completion of the erase operation. As such, the extended storage space of the write buffer is used to buffer the write data sent by the host during the erase operation, so as to alleviate a latency caused by the write buffer without the extended storage space failing to respond to the write data of the host during the erase operation, reducing a write latency produced during the erase operation, and thereby improving the performance of the memory system.

Figure 11:
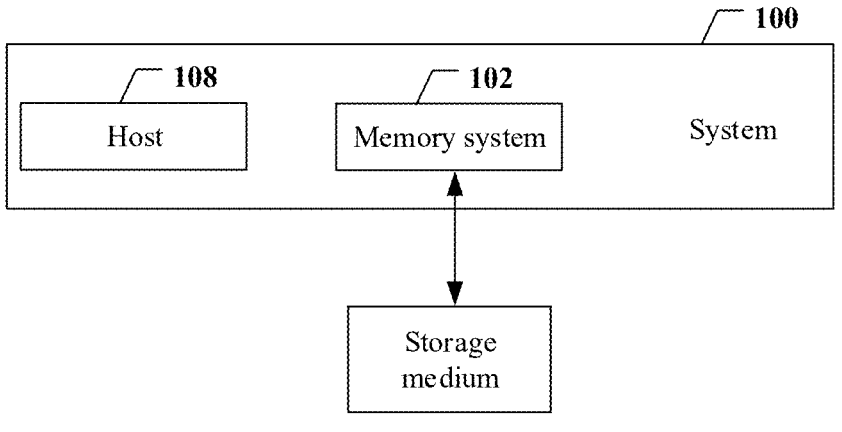
FIG. 11 is a schematic diagram of a constituent structure of a storage medium provided in examples of the present application.

With reference to FIG. 11, FIG. 11 is a schematic diagram of a constituent structure of a storage medium provided in examples of the present application. In a third aspect, examples of the present application provide a storage medium. As shown in FIG. 11, the storage medium stores executable instructions that, when executed by a processor, implement operations of any method of operating a memory system provided in the second aspect.

In some examples, the storage medium may be a Ferromagnetic Random Access Memory (FRAM), a Read Only Memory (ROM), a Programmable Read-Only Memory (PROM), an Erasable Programmable Read-Only Memory (EPROM), an Electrically Erasable Programmable Read-Only Memory (EEPROM), a Flash Memory, a magnetic surface memory, an optical disk, or a CD-ROM (Compact Disc Read-Only Memory) and other memories, or various apparatuses comprising any one or any combination of the above memory devices.

In some examples, executable instructions may be written in any form of programming language (comprising a compiled or interpreted language, or a declarative or procedural language) by adopting a form of a program, a software, a software module, a script or codes; and they may be deployed in any form, comprising deployed as an independent program or as a module, a component, a subroutine, or other units suitable for use in a computing environment.

As an example, the executable instructions may, but do not necessarily, correspond to a file in a file system, may be stored in part of a file storing other programs or data, for example, stored in one or more scripts in a Hyper Text Markup Language (HTML) document, stored in a single file dedicated for the discussed program, or stored in a plurality of cooperative files (e.g., the file for storing one or more modules, subprograms or code portions).

As an example, the executable instructions may be deployed on an electronic apparatus for execution, or on a plurality of electronic apparatuses at one site for execution, or distributed on a plurality of electronic apparatuses interconnected through a communication network distributed at a plurality of sites for execution.

In some examples, with reference to FIG. 11, FIG. 11 is a schematic diagram of a constituent structure of a storage medium provided in examples of the present application. The storage medium comprises a partial storage medium corresponding to the memory system 102, and the partial storage medium may be configured to implement operations of the method of operating the memory system in the above examples of the present application.

Examples of the present application provide a memory system, a method of operating the memory system, and a storage medium.

In a first aspect, examples of the present application provide a memory system, comprising at least one memory device and a memory controller, wherein the memory controller is coupled with both a host and the memory device and comprises a write buffer and a control section coupled with the write buffer; the control section is configured to: in response to upcoming execution of an erase event of a block in the memory device, configure a portion of an idle storage space of the memory controller as a newly-added storage space of the write buffer; write data received from the host to the newly-added storage space of the write buffer in response to execution of the erase event; and release the newly-added storage space of the write buffer in response to completion of the erase event.

In some examples, the control section is configured to: cause all newly-added storage spaces allocated to the write buffer in response to erase events of different blocks to have the same size.

In some examples, a size of the newly-added storage space allocated to the write buffer is positively correlated with an average duration of the erase event of the block.

In some examples, the control section is configured to: write data stored in the write buffer to the memory device in response to an amount of data stored in an original storage space of the write buffer being greater than or equal to a preset threshold.

In some examples, the control section is configured to: in response to the memory device requiring opening of a new block for data writing, control the memory device to perform an erase operation on the new block before writing data to the new block, wherein a start of the erase operation is execution of the erase event, and an end of the erase operation is completion of the erase event.

In some examples, the control section is configured to: in response to the amount of the data stored in the original storage space of the write buffer being greater than or equal to the preset threshold and the memory device requiring the opening of the new block for data writing, determine the upcoming execution of the erase event of the memory device, generate an erase command, and send the erase command to the memory device.

In some examples, the control section is configured to: in response to the completion of the erase event, write the data in the original storage space of the write buffer and the data in the newly-added storage space of the write buffer sequentially to the memory device in a chronological order of writing to the original storage space of the write buffer and to the newly-added storage space of the write buffer; and release the newly-added storage space of the write buffer in response to completion of writing the data in the newly-added storage space of the write buffer to the memory device.

In some examples, the original storage space of the write buffer is smaller than a preset storage space.

In some examples, the memory controller further comprises a volatile memory device, and a portion of a storage space of the volatile memory device is used as the original storage space of the write buffer and the newly-added storage space of the write buffer.

In some examples, the memory device comprises a NAND, and the volatile memory device comprises an SRAM/DRAM.

In some examples, the memory system comprises an enterprise solid state drive (eSSD).

In a second aspect, examples of the present application provide a method of operating a memory system, comprising: in response to upcoming execution of an erase event of a block in a memory device coupled with a memory controller of the memory system, configuring, by a control section of the memory controller, a portion of an idle storage space of the memory controller as a newly-added storage space of a write buffer of the memory controller coupled with the control section; writing data received from a host coupled with the memory controller to the newly-added storage space of the write buffer in response to execution of the erase event; and releasing the newly-added storage space of the write buffer in response to completion of the erase event.

In some examples, the portion of the idle storage space of the memory controller is allocated to the write buffer, and the method comprises: causing all newly-added storage spaces allocated to the write buffer in response to erase events of different blocks to have the same size.

In some examples, the method comprises: writing data stored in the write buffer to the memory device in response to an amount of data stored in an original storage space of the write buffer being greater than or equal to a preset threshold.

In some examples, the method comprises: in response to the memory device requiring opening of a new block for data writing, controlling the memory device to perform an erase operation on the new block before writing data to the new block, wherein a start of the erase operation is execution of the erase event, and an end of the erase operation is completion of the erase event.

In some examples, the method comprises: in response to the amount of the data stored in the original storage space of the write buffer being greater than or equal to the preset threshold and the memory device requiring the opening of the new block for data writing, determining the upcoming execution of the erase event of the memory device, generating an erase command, and sending the erase command to the memory device.

In some examples, the newly-added storage space of the write buffer is released, and the method comprises: in response to the completion of the erase event, writing the data in the original storage space of the write buffer and the data in the newly-added storage space of the write buffer sequentially to the memory device in an order of writing; and releasing the newly-added storage space of the write buffer in response to completion of writing the data in the newly-added storage space of the write buffer to the memory device.

In a third aspect, examples of the present application provide a storage medium, which stores executable instructions that, when executed, implement operations of the method of a memory system provided in the second aspect.

In the examples of the present application, the control section of the memory system is configured to increase the storage space of the write buffer dynamically. In an implementation, a storage space of the write buffer is temporarily added when upcoming occurrence of the erase event of the block of the memory system is detected. Adding the space of the write buffer is used for buffering write data sent by the host during the erase operation, and the write buffer is recovered to its original size after the erase operation is ended, wherein an available storage space of the write buffer during the erase operation comprises the original storage space of the write buffer and the added storage space, and the added storage space of the write buffer is released after the completion of the erase operation. As such, the extended storage space of the write buffer is used to buffer the write data sent by the host during the erase operation, so as to alleviate a latency caused by the write buffer without the extended storage space failing to respond to the write data of the host during the erase operation, reducing a write latency produced during the erase operation, and thereby improving the performance of the memory system.

It is to be understood that "one example" and "an example" mentioned in the whole specification mean that features, structures, or characteristics related to the example is included in at least one example of the present application. Therefore, "in one example" or "in an example" presented everywhere throughout this specification does not necessarily refer to the same example. Furthermore, these features, structures, or characteristics may be incorporated in one or more examples in any suitable manner. It is to be understood that, in various examples of the present application, sequence numbers of the above processes do not indicate an execution sequence, and an execution sequence of various processes shall be determined by functionalities and intrinsic logics thereof, and shall constitute no limitation on an implementation process of the examples of the present application. The above sequence numbers of the examples of the present application are only for description, and do not represent goodness and badness of the examples.

The above descriptions are merely preferable implementations of the present application, and not intended to limit the patent scope of the present application. Equivalent structure transformation made within using the contents of the specification and the drawings of the present application under the inventive concept of the present application, or direct/indirect application to other related technical fields are both encompassed within the patent protection scope of the present application.

What is claimed is:

1. A memory system, comprising:
at least one memory device; and
a memory controller coupled with both a host and the at least one memory device, including:
    a write buffer; and
    a control section coupled with the write buffer and configured to:
        in response to an upcoming execution of an erase event of a block in the at least one memory device, configure a portion of an idle storage space of the memory controller as a newly-added storage space of the write buffer;
        write data received from the host to the newly-added storage space of the write buffer during execution of the erase event; and
        release the newly-added storage space of the write buffer in response to completion of the erase event.

2. The memory system of claim 1, wherein the control section is configured to, in response to erase events for different blocks, cause all newly-added storage spaces allocated to the write buffer to have the same size.

3. The memory system of claim 2, wherein a size of the newly-added storage space allocated to the write buffer is positively correlated with an average duration of the erase event of the block.

4. The memory system of claim 1, wherein the control section is configured to, in response to an amount of data stored in an original storage space of the write buffer being greater than or equal to a preset threshold, write the data stored in the write buffer to the at least one memory device.

5. The memory system of claim 4, wherein the control section is configured to, in response to the at least one memory device requiring opening of a new block for data writing, control the at least one memory device to perform an erase operation on the new block before writing the data to the new block, wherein a start of the erase operation is the execution of the erase event, and an end of the erase operation is completion of the erase event.

6. The memory system of claim 5, wherein the control section is configured to, in response to the amount of the data stored in the original storage space of the write buffer being greater than or equal to the preset threshold and the at least one memory device requiring the opening of the new block for data writing:
determine the upcoming execution of the erase event of the at least one memory device;
generate an erase command; and
send the erase command to the at least one memory device.

7. The memory system of claim 1, wherein the control section is configured to:
in response to the completion of the erase event, write the data in an original storage space of the write buffer and the data in the newly-added storage space of the write buffer sequentially to the at least one memory device in a chronological order of writing to the original storage space of the write buffer and to the newly-added storage space of the write buffer; and
release the newly-added storage space of the write buffer in response to completion of writing the data in the newly-added storage space of the write buffer to the at least one memory device.

8. The memory system of claim 1, wherein an original storage space of the write buffer is smaller than a preset storage space.

9. The memory system of claim 1, wherein the memory controller further includes a volatile memory device, and a portion of a storage space of the volatile memory device is used as an original storage space of the write buffer and the newly-added storage space of the write buffer.

10. The memory system of claim 9, wherein the at least one memory device includes a three-dimensional Not And (AND) memory, and the volatile memory device includes a Static Random-Access Memory (SRAM) or Dynamic Random-Access Memory (DRAM).

11. The memory system of claim 1, including an enterprise solid state drive (eSSD).

12. A method of operating a memory system, comprising:
   in response to an upcoming execution of an erase event of a block in a memory device coupled with a memory controller of the memory system, configuring, by a control section of the memory controller, a portion of an idle storage space of the memory controller as a newly-added storage space of a write buffer of the memory controller coupled with the control section;
   writing data received from a host coupled with the memory controller to the newly-added storage space of the write buffer in response to during execution of the erase event; and
   releasing the newly-added storage space of the write buffer in response to completion of the erase event.

13. The method of claim 12, wherein the portion of the idle storage space of the memory controller is allocated to the write buffer, and the method includes, in response to erase events for different blocks, causing all newly-added storage spaces allocated to the write buffer to have the same size.

14. The method of claim 12, including, in response to an amount of data stored in an original storage space of the write buffer being greater than or equal to a preset threshold, writing the data stored in the write buffer to the memory device.

15. The method of claim 14, including, in response to the memory device requiring opening of a new block for data writing, controlling the memory device to perform an erase operation on the new block before writing the data to the new block, wherein a start of the erase operation is the execution of the erase event, and an end of the erase operation is completion of the erase event.

16. The method of claim 15, including, in response to the amount of the data stored in the original storage space of the write buffer being greater than or equal to the preset threshold and the memory device requiring the opening of the new block for data writing:
   determining the upcoming execution of the erase event of the memory device;
   generating an erase command; and
   sending the erase command to the memory device.

17. The method of claim 12, wherein the newly-added storage space of the write buffer is released, and the method includes:
   in response to the completion of the erase event, writing the data in an original storage space of the write buffer and the data in the newly-added storage space of the write buffer sequentially to the memory device in an order of writing; and
   releasing the newly-added storage space of the write buffer in response to completion of writing the data in the newly-added storage space of the write buffer to the memory device.

18. The method of claim 12, wherein the memory device includes a three-dimensional Not And (NAND) memory.

19. The method of claim 12, wherein the memory system includes an enterprise solid state drive (eSSD).

20. A non-transitory computer-readable storage medium, storing executable instructions that, when executed, implement operations of a method of operating a memory system, the method comprising:
   in response to an upcoming execution of an erase event of a block in a memory device coupled with a memory controller of the memory system, configuring, by a control section of the memory controller, a portion of an idle storage space of the memory controller as a newly-added storage space of a write buffer of the memory controller coupled with the control section;
   writing data received from a host coupled with the memory controller to the newly-added storage space of the write buffer to during execution of the erase event; and
   releasing the newly-added storage space of the write buffer in response to completion of the erase event.

* * * * *